3/4/86 CR H 000,037

United States Statutory Invention Registration [19]

[11] Reg. Number: H37

Schettino

[45] Published: Mar. 4, 1986

[54] FILM PACK HAVING IMPROVED PACK SPRING

[75] Inventor: Anthony J. Schettino, Arlington, Mass.

[73] Assignee: Polaroid Corporation, Cambridge, Mass.

[21] Appl. No.: 740,724

[22] Filed: Jun. 3, 1985

[51] Int. Cl.[4] ..... B65D 85/38

[52] U.S. Cl. ..... 206/316; 206/455

*Primary Examiner*—Harold J. Tudor

*Attorney, Agent, or Firm*—Leslie J. Payne

[57] ABSTRACT

The present disclosure relates to a pack spring for film units, and an improved film pack including the spring. The pack spring comprises arm assemblies which maintain the image area, pod and trap of each film unit in the stack in a generally flat condition. The leg assemblies are constructed so as to avoid twisting of the pack spring.

4 Claims, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FILM PACK HAVING IMPROVED PACK SPRING

BACKGROUND OF THE INVENTION

This invention relates generally to film packs usable in photographic cameras of the instant developing type. More particularly, it relates to film packs employing an improved yeildable supporting platform which supports the stack in such a manner that succesive topmost units are urged to the exposure station in a flat condition and are capable of being easily ejected therefrom.

Self-developing film units of the kind utilized in instant photography are typically housed in a film pack cassette having a yieldable supporting platform for supporting a stack of film units. These units have an image-receiving area bordered, in part, by a rupturable fluid pod and a trap at leading and trailing ends of the film unit; respectively. The spring tends to urge each topmost unit against the interior of a flat wall defining the aperture of the cassette. It is extremely important in these systems that the film units be in as flat a condition as possible when presented at a film focal plane. This is because a curved or bent film results in lack of image sharpness. Adequately, supporting these film units is relatively difficult given their physical characteristics. More specifically, because of their thin, flexible and uneven weighted and dimensioned nature the units tend to sag or bend easily. Sagging besides affecting flatness, inhibits proper picking of successive units to the pressure applying rollers. This also hinders exiting of the units from a cassette exit slot. Another factor relating to the physical characteristics of the film units is that the biasing force on the units cannot be too strong, otherwise rupturing of the topmost film unit against the cassette housing may result. Also, if the force is too great jamming of the unit against the housing may cause film bending or buckling, thereby making it difficult to eject.

Representative examples of film packs having biasing platforms in film packs having multiple film units are described and shown in the U.S. Pat. Nos. 3,543,662; 3,595,661; 3,707,116; 3,821,049; 3,682,076; and, German Pat. No. DE 33 40 175 Al.

SUMMARY OF THE INVENTION

According to the present invention there is provided a film pack having an improved platform for use in photographic apparatus of the self-developing type which overcome the difficulties noted above.

Included is a film cassette assembly having a space which can store a stack of film units. The film units are of the self-developing kind, wherein each includes an image forming area bordered by a frame having a rupturable pod of processing fluid along one marginal edge and a trap for receiving processing fluid, which has been spread over the image area, at an opposite edge. Returning to the cassette it includes an aperture in operative relationship with successive topmost units in the stack so that each can be exposed. Formed in the cassette in adjoining cooperative relationship with each topmost film unit is an exit slot permitting exiting of each exposed unit.

This invention includes means for yieldably supporting the stack so that successive topmost units of a stack are supported in a generally flat condition in operative relationship with the aperture. The yieldably supporting means includes a central supporting bar which supports the film's image area. Each of a pair of yieldable arm assemblies extend in opposite directions from the bar for yieldably supporting the image area adjacent the pod and the trap as well as keeping the pod and trap in the same general plane as the image area. Each of a pair of yieldable leg assemblies extend in opposite directions from the bar for yieldably urging the stack in the direction of the aperture. The yieldable leg assemblies have spring rates such that they avoid tilting of the central bar about its longitudinal axis is avoided, thereby helping to maintain each unit in a desired plane.

Among the objects of the invention are, therefore, the provision of having a stack of individual film units in a film pack for use with instant cameras which pack has an improved yieldable supporting device; the provision of a yieldable supporting device which supports the load of a film stack in such a manner that the image-receiving area of each topmost unit is maintained in a generally flat condition during exposure and subsequent ejection from the cassette; the provision of a yieldable supporting device which counteracts sagging caused by the pod and the trap; the provision of a yieldable supporting device which minimizes picking problems during film unit ejection.

Other objects and further scope of applicability of the present invention will become apparent from the detailed description to follow when taken in conjunction with the accompanying drawings in which like parts are designated by like reference numerals.

DETAILED DESCRIPTION

Figure 1:
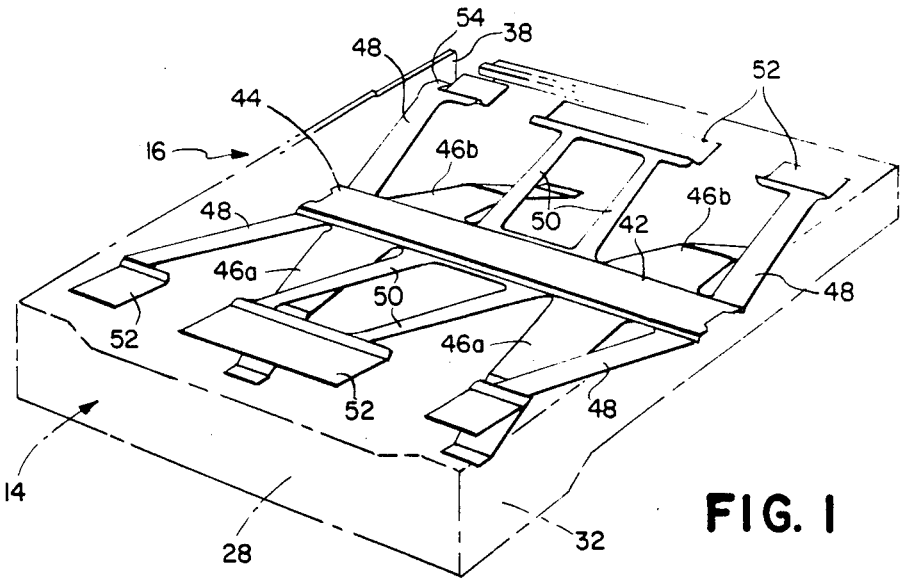
FIG. 1 is a perspective view of a pack spring made in accordance with the present invention and is shown positioned within a film pack cassette housing.
Figure 2:
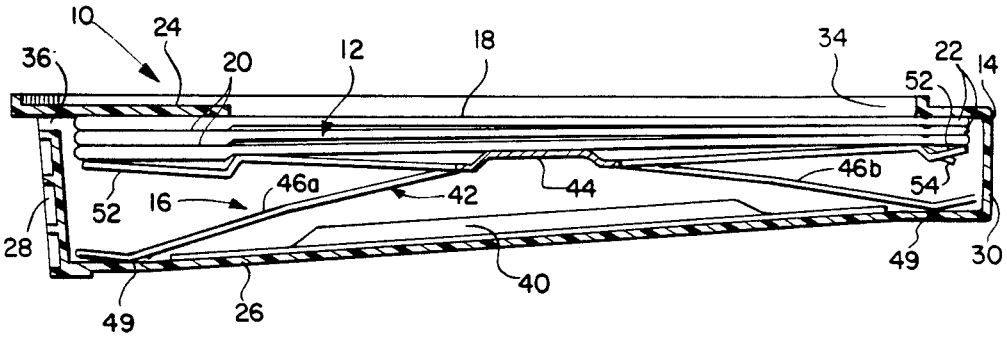
FIG. 2 is a longitudinal cross-sectional view showing the pack spring cooperating with film units in a film cassette; and, FIG. 3 is a plan view of the pack spring of the present invention.
Figure 3:
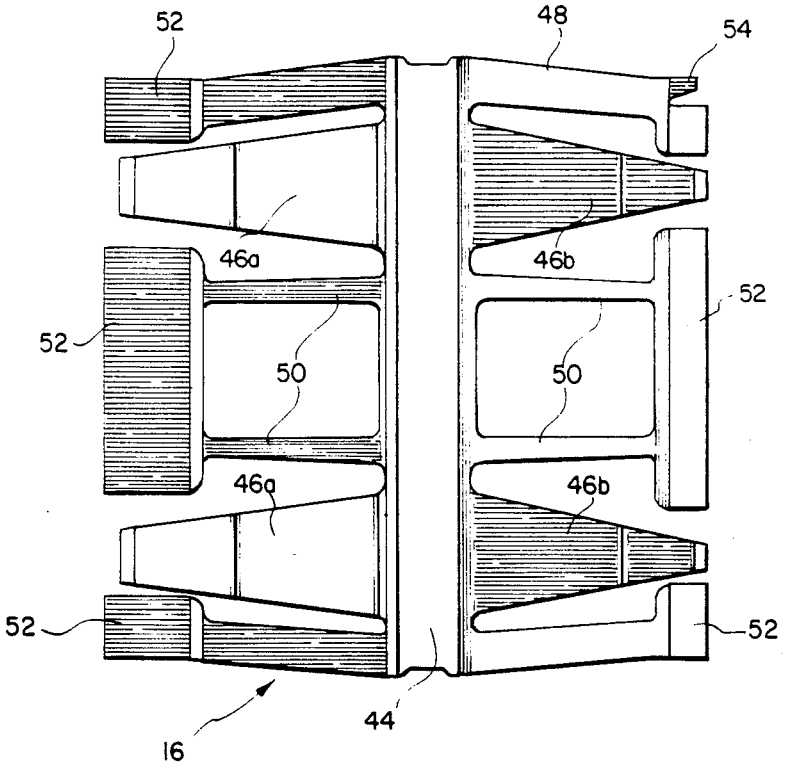

Reference is now made to FIGS. 1–3 depicting a film pack assembly 10. Included in the film pack assembly 10 is a stack of film units 12 of the instant-developing kind, a cassette or container 14 which houses a plurality of the film units 12, and a yieldable supporting means 16 for supporting the film units.

The film units 12 are of the self-developing kind, wherein each includes an image-forming area 18 bordered by a frame 19 having a rupturable pod 20 of processing fluid along one marginal edge and at an opposite edge a trap 22 for receiving excess spread processing fluid. Representative examples of film packs 10 having multiple film units each with formats described above can be found in commonly assigned U.S. Pat. Nos. 3,543,662; 3,705,542; 3,748,948 and 3,779,770. Each film unit is adapted to be processed by advancing it to and between a pair of pressure-applying spread rollers (not shown). The spread liquid contacts both the positive and image receiving elements in the unit and serves to effect a diffusion transfer process, whereby the latent images on the film are developed. The pod 20 of rupturable processing fluid is located at the leading edge of the film unit 12. Clearly the pod 20 defines the maximum thickness and this also adds considerably to the weight of each unit. The trap 22, located at the trailing edge of each film unit serves to collect any surplus processing fluid. The trap or training edge 22 is also heavier than the central image-forming area 18 of the film unit. It too must be adequately supported to insure proper picking of each film unit.

Reference is made to FIG. 2 for showing, in somewhat greater detail, the film cassette 14. Only those details of the film cassette 14 necessary for an understanding of the present invention will be set forth. The film cassette 14 has a generally parallelepiped structure and is made of an opaque material. The parallelepiped structure includes a top wall 24, bottom wall 26, forward and rearward walls 28, 30 and side walls 32. The top wall 24 defines a generally rectangular light exposure aperture 34 which encompasses the image-forming area 18 of each film unit 12. The film pack 10 is constructed to fit within a camera (not shown) of the instant developing kind, whereby when each of the film units is presented at the aperture 34 they are in effect, at the focal plane of the camera lens system. In this manner the scene images directed by the camera's focal system will be focused on the image-forming area 18.

Formed in the forward wall 28 is a film exit slot 36. The slot 36 is, when the cassette 14 is stored in the camera, adjacent the bite of a pair of spread rollers (not shown) which form part of the film processing apparatus. It will be understood that subsequent to exposure, the film units 12 will be advanced through the exit slot 36 to and between the nip of the spread rollers. As noted above, the spread rollers compress the rupturable pod 20 and spread the fluid over the image-forming area 18. Also formed in the top wall 24 is a pick access slot 38 which allows a suitable pick mechanism, not shown but described in the last-noted patents to advance the topmost film unit through the exit slot 36.

A generally flat electrically battery 40 is stored in the bottom of the cassette 14 to form part of the cassette assembly. The battery 40 is of the type manufactured by Polariod Corporation of Massachusetts and used in conjunction with film packs 10. Such a battery 40 serves to provide all the electrical power necessary to perform the camera operations for the film units 12 contained within the film pack 10.

Positioned between the stack array of film units 12 and the battery 40 is the yieldable support means 16. In this embodiment it is a yieldable pack spring or supporting platform 42 which serves multi-functions. The platform 42 feeds successive topmost film units to the focal plane, while supporting them in a generally flat condition. At the same time it insures that they do not hang-up during ejection. Additionally, the pack spring 42 facilitates holding down the battery 40. This latter feature insures a more positive engagement between the battery and the camera's electrical system.

The pack spring 42 is an integral spring steel body provided with a generally elongated and flat central supporting bar 44. The supporting bar 44 contacts the stack of film units 12 beneath the medial portion of the image forming areas. This supports the flexible film units 12 as to counteract sagging of the central portion of the units. Hence, this facilitates film flatness. The central supporting bar 44 extends across the width of the entire stack of units, but need not have its distal ends contact the walls of the cassette 14.

Extending in a splayed relationship from the central supporting bars 44 are two pairs of yieldable supporting legs 46*a,b*. These legs 46*a,b* are appropriately tapered and bent to provide the pack spring 42 with a generally flat spring rate. Such a rate is necessary for yieldably urging the entire film stack upwardly, whereby successive topmost film units are urged against the flat inner surface of the top wall 24 with about the same force. In other words, the force of the pack spring 42 on each topmost unit is generally constant despite the deflection that the pack spring 42 undergoes from a fully loaded condition (i.e. when the complete stack is on) to a condition wherein only a single unit is carried thereby. Because of the configuration of the cassette 14, the pair of leading support legs 46*a* (FIG. 2) is longer than the pair of trailing supporting legs 46*b* whereby the pair of longer legs 46*a* can contact the front wall 28 and aid in centering the central bar 44 in the aperture 34.

To avoid twisting of the central supporting bar 44 about its longitudinal axis, the spring rates of both pairs of legs 46*a,b* are the same. To accomplish this the legs 46*a* which are longer have less of a taper than the shorter legs 46*b* (FIG. 3). The taper extends from the supporting central bar 44 and terminates at the toes or terminal ends of each supporting leg. The toes are actually bent upward and the bend tends to make a generally smooth and rounded corner 49. This corner 49 facilitates insertion of the pack spring in the cassette 14 without dragging or creating a chip. A chip is a piece of gouged plastic from the cassette wall which can be created during insertion of the pack spring. Chips can create problems. For instance, cameras of the type which use instant film tend to create a lot of static electricity. Because of such static electricity there is a possibility that a chip could find its way into the optical system of the camera. Obviously, this is undesirable. Also, the legs 46*a,b* are bent so that they can clear the battery when deflected. In this manner the spring rate will not change undesirably as it contacts the battery.

Integrally attached to the central supporting bar 44 are opposed pairs of outer and inner yieldably supporting arms 48 and 50; respectively. Each of the yieldable supporting arms 48,50 are preloaded having sloped supporting surfaces 52 which are adapted to support the stacked pods 20 and traps 22, whereby the loads thereof are distributed evenly. It is important that the pack spring 42 force not be so strong as to rupture the pod 20 against the top wall 24 or inhibit ejection of the film unit 12 from the cassette 14. The outer or lateral yieldable arms 48 are adapted to support the film corners. The central or inner arms 50 are adapted to support the central portion of the leading and trailing edges containing the pods 20 and traps 22 in such a manner as to counteract bending of the unit and facilitate keeping the unit generally flat. Moreover, the arms 48,50 do not force the units in such a manner as to frictionally bind them to the top wall 24. This minimizes substantially hang-up of the units 12 during ejection from the cassette 14. Also, since the units tend to be flat they are aligned properly with the exit slot 36. This facilitates easier and proper film unit withdrawal. The supporting surfaces 52 are angled (such as shown in FIG. 2) so that the pack spring forces do not bear directly against the major surface of the pod 20 or trap 22. Thus, there is less likelihood of the pods rupturing or the traps 22 being squeezed. Further, this reduces sliding friction of the film units.

To facilitate picking of the last few units, there is provided a picking ramp 54, such as best shown in FIGS. 2 and 3, on one of the lateral arms 48. The ramp 54 is positioned adjacent the pick slot 38. The ramp 54 serves to protect against the pick catching the spring. In this manner, in event of no film in the pack, the pick won't be able to catch the spring. A pick arm (not shown) runs along the pick slot 38 formed in the cassette and contacts and pushes the trailing edge of the topmost film unit. As the unit exits the slot 36 it is brought into the bit of the pressure-applying rollers. Thereafter, the rollers pull the unit from the cassette to complete processing.

It will be appreciated that the yieldable supporting arms 48,50 have sufficient clearance from the interior surfaces of the cassette as to not allow cocking of the pack spring.

Since certain changes may be made in the above-described pack spring without departing from the scope of the invention herein involved, it is intended that all matter contained in the description or shown in the accompanying drawings shall be interpreted as illustrative and not in a limiting sense.

What is claimed is:

1. A pack spring for use in a film pack of the type for use in photographic apparatus of the self-developing type wherein the pack includes a film cassette assembly having a space which stores a stack of film units, an aperture in operative relationship with each topmost film unit in the stack so that successive topmost units can be exposed, and an exit slot in adjoining cooperative relationship with each topmost film unit so as to allow exiting of exposed topmost units; and a stack of film units of the self-developing kind, wherein each of said units includes an image forming area bordered by a frame having a rupturable pod of procesing fluid along one marginal edge of the unit and a trap for receiving processing fluid which has been spread over the image area along a second opposite marginal edge; said pack spring comprises:

means for yieldably supporting the stack upwardly so that successive topmost units are urged into operative relationship with the aperture in a generally flat condition, said supporting means including a central supporting bar which supports centrally the image areas of the stacked units; yieldable arm assemblies extending in opposite directions from said bar wherein said assemblies support evenly the image forming area of the film adjacent the pod and the trap as well as the pod and the trap so that respective ones of said marginal edges are in the same general plane as the image area when the nut is at least the topmost; and a pair of yieldable leg assemblies each extending in opposite directions from said bar which contact the cassette assembly so as to support the load of stacked units in a manner which avoids lateral twisting of said bar about its longitudinal axis, whereby the image area, the pod and the trap are generally flat and can be advanced through said exit slot.

2. The spring of claim 1 wherein each of said arm assemblies include angles supporting surfaces for supporting the edges of said pod and said trap thereby minimizing direct pressure on each of said pod and trap.

3. A film pack of the type for use in photographic apparatus of the self-developing type comprising:

a film cassette assembly having a space which can store a stack of film units, an aperture in operative relationship with each topmost film unit in the stack so that successive topmost units can be exposed, and an exit slot in adjoining cooperative relationship with each topmost film unit so as to allow exiting of exposed topmost units;

a stack of film units of the self-developing kind, wherein each of said units includes an image forming area bordered by a frame having a rupturable pod of processing fluid along one marginal edge of the unit and a trap for receiving processing fluid which has been spread over the image area along a second opposite marginal edge; and, means for yieldably supporting said stack upwardly so that successive topmost units are urged into said operative relationship with said aperture in a generally flat condition, said supporting means including a central supporting bar which supports centrally the image of areas of said stacked units; yieldable arm assemblies extending in opposite directions from said bar wherein said assemblies support evenly said image forming area of said units adjacent the marginal edges of said pod and said trap as well as said pod and said trap so that respective pairs of said marginal edges are in the same general plane as the image are; and a pair of yieldable leg assemblies each extending in opposite directions from said bar which contact said cassette assembly so as to support the load of stacked units in a manner which avoids lateral twisting of said bar about its longitudinal axis, whereby said image areas, said pod, and said trap are generally flat and can be advanced from said cassette assembly through said exit slot.

4. The film pack of claim 3 wherein each of said arm assemblies include angled supporting surfaces for supporting the edges of said pod and and said trap, thereby minimizing direct pressure on each of said pod and trap.

* * * * *